United States Patent [19]
Dammann et al.

[11] Patent Number: 4,585,307
[45] Date of Patent: Apr. 29, 1986

[54] COMPOUND OPTICAL PHASE GRATING AND SWITCHING DEVICES COMPRISING SUCH A GRATING

[76] Inventors: Hans Dammann, Eichenstrasse 27, 2081 Tangstedt; Heinrich Kurz, Haidkamp 2, 2080 Pinneberg, both of Fed. Rep. of Germany

[21] Appl. No.: 574,775

[22] Filed: Jan. 27, 1984

[30] Foreign Application Priority Data

Feb. 3, 1983 [DE] Fed. Rep. of Germany ....... 3303623

[51] Int. Cl.$^4$ .............................................. G02B 5/18
[52] U.S. Cl. ........................... 350/162.22; 350/162.23
[58] Field of Search ........... 350/96.19, 162.16, 162.17, 350/162.2, 162.21, 162.22, 162.23, 162.24

[56] References Cited

U.S. PATENT DOCUMENTS 4,257,673  3/1981  Matthijsse ........................ 350/96.19
4,360,251  11/1982  Rajchman ........................ 350/162.2

OTHER PUBLICATIONS

Shirasaki, M., et al., "Bistable Magnetooptic Switch for Multimode Optical Fiber," *Applied Optics*, vol. 21, No. 11, pp. 1943-1949 (Jun. 1982).
Tanaka, T. P., et al., "Simple and Reliable Optical Bypass Switch for Fiber-Optic Data Bus Application," *7th Euro. Conf. Opt. Comm.*, Copenhagen, pp. P15-1 to P15-4 (1981).
Minowa, J. et al., "Nonblocking 8×8 Optical Matrix Switch for Fiber-Optic Communication," *Electronics Lett.*, vol. 16, No. 11, pp. 422-423 (Apr. 1980).
Philips-Rutz, E. M., et al., "Electrooptic Bragg Diffraction Switches in Low Cross-Talk Integrated Optics Switching Matrix," *Applied Optics*, vol. 21, No. 12, pp. 2189-2194 (Jun. 1982).
Dammann, H. "Blazed Synthetic Phase-Only Holograms," *Optik*, vol. 31, No. 1, pp. 95-104 (1970).
Dammann, H., "From Prism-Prism via Grating-Prism to Grating-Grating Compounds," *Applied Optics*, vol. 19, No. 14, pp. 2276-2278 (Jul. 1980).
Dammann, H., "Spectral Characteristic of Stepped-Phase Gratings," *Optik*, vol. 53, No. 5, pp. 409-417 (1979).

Primary Examiner—John K. Corbin
Assistant Examiner—B. S. Shapiro
Attorney, Agent, or Firm—Marc D. Schechter

[57] ABSTRACT

The invention relates to a compound blazed optical phase grating. The grating comprises at least two grating sections which are disposed opposite each other in parallel planes. The gratings have grooves which extend parallel to each other. The grating sections have equal grating periods and are movable relative to each other within their planes and perpendicular to the grooves. Over one grating period, the optical path length varies at least substantially parabolically and symmetrically relative to the grating period. The path length varies in such a manner that when both grating sections are symmetrically arranged relative to a common line perpendicular to the grating planes, the optical path length through the compound grating is uniform across the grating. Various optical switches and switching matrixes can be formed by using such compound phase gratings.

15 Claims, 12 Drawing Figures

COMPOUND OPTICAL PHASE GRATING AND SWITCHING DEVICES COMPRISING SUCH A GRATING

BACKGROUND OF THE INVENTION

The present invention relates to a compound blazed optical phase grating.

Such a grating is described in an article by H. Dammann entitled "From prism-prism via grating-prism to grating-grating compounds" (Applied Optics, Vol. 19, No. 14, 15 July 1980, pages 2276 to 2278). Blazed phase gratings of the type described in this article have substantially sawtooth-shaped profiles. These gratings diffract light into specific diffraction orders with a high efficiency. The diffraction order depends, inter alia, on the inclination of the groove walls. How the remainder of the light is distributed over the other diffraction orders is generally irrelevant.

However, once the grating parameters are chosen, gratings of this type do not diffract light with a high efficiency into other diffraction orders. Once the diffraction order is determined by the selected grating profile, it cannot be varied.

SUMMARY OF THE INVENTION

It is an object of the invention to provide a compound optical phase grating whose sawtooth-shaped optical profile can be varied simply so that the light can be switchably diffracted into different diffraction orders. An optical switch can be constructed in a simple manner from such a grating.

According to the invention, the compound phase grating comprises at least two grating sections. The two grating sections are disposed opposite one another in parallel planes and have grooves which extend parallel to each other. The grating sections have equal grating periods and are movable relative to each other within their planes in a direction perpendicular to the groove. Over one grating period the grating profile is at least substantially parabolic and symmetrical. The grating profiles are such that when both grating sections are arranged symmetrically around a common line perpendicular to the grating planes, the optical path length through the compound grating is uniform across the grating.

If the grating sections are symmetrical about a line which extends perpendicular to the grating planes, this means that, for example, with two grating sections one grating hill of one grating section is situated exactly above a grating hill of the other grating section. Alternatively, a grating hill of one grating section and a grating valley of another grating section may be situated on a common line which extends perpendicular to the grating planes. This configuration is hereinafter referred to as the initial configuration and is the configuration in which the grating sections are not shifted relative to each other.

In the initial configuration, the sum of the optical path lengths through the grating sections, viewed perpendicularly to the grating planes, is uniform across the grating.

This means that a light beam which is incident, preferably at right angles, upon the compound phase grating is not influenced at all by the grating structure of the grating sections, because there is no effective optical grating structure. As a result, the light beam is not deflected. The compound grating is thus configured to diffract the beam into the zeroth order.

However, if the grating sections are shifted relative to each other by a fraction of their grating periods out of the initial configuration, the effective optical structure of the compound phase grating is changed. Depending on the magnitude and the direction of the displacement of the grating sections relative to each other, the effective grating structure deflects the incident light beam into a higher order, for example the ±1st or higher orders. Thus, shifting the grating sections switches the light beam between different diffraction orders, permitting the grating to be employed as an optical switch.

In an embodiment of the invention, the grating sections are digital phase gratings (i.e. the grating profile changes in a plurality of steps within one grating period). Such a grating may be formed, for example, by providing a transparent substrate having a constant refractive index with steps of different heights. Alternatively, adjacent areas having different refractive indices may be formed in a transparent substrate of constant thickness.

Digital phase gratings have the advantage that they can be manufactured in a comparatively simple manner. They can be constructed with a comparatively high efficiency so as to diffract substantial portion of the incident light into a desired diffraction order. Only a very small amount of light is diffracted into the adjacent diffraction orders.

In another embodiment, the grating sections are analog phase gratings, which may also be relief and/or refractive-index gratings. Both analog and digital refractive-index phase gratings have the advantage that they can be shifted relative to each other in a simple manner because they comprise flat plates of constant thickness.

IN another advantageous embodiment of the invention, one grating section is a relief grating and is provided with a reflective layer on its upper surface. The compound phase grating thus constructed can be used as a reflection grating.

A particularly advantageous embodiment of the invention is an optical switch having a first optical port and a plurality of second optical ports. The switch further comprises a light-deflecting element for optically connecting the first port to only one of the second ports. In this optical switch, the light-deflecting element is a compound phase grating according to the invention. The second optical ports are disposed in the central diffraction orders of the compound phase grating.

Various types of optical switches with mechanically movable parts are known. For example, the use of pentagonal prisms is disclosed in an article by J. Minowa, et al, entitled "Nonblocking 8×8 Optical Matrix Switch For Fibre-Aptic Communications" (*Electronics Letters*, Vol. 16, No. 11, April 1980, pages 422–423). These prisms are moved into the radiation path by small electromagnets. They then deflect the beam and thereby provide the switching action.

Alternatively, optical glass fibers may be moved relative to each other parallel to their end faces to enable coupling into different fibers. This is described in an article by T. P. Tanaka, et al entitled "Simple and Reliable Optical Bypass Switch for Fibre-optic Data Bus Application (*7th European Conf. on Opticl Comm.*, Copenhagen, 1981, pages P15-1 to P15-4).

Nonmechanical optical switches can be constructed using magnetooptical or electrooptical effects. Magnetooptical switches, disclosed by M. Shirasakai, et al in an article entitled "Bistable magnetooptic switch for multimode optical fiber" (*Applied Optics*, Vol. 21, No. 11, June 1982, pages 1943-1949), in principle can operate only with polarized light. Such switches can be used with unpolarized light only with the aid of additional, very intricate means. Electrooptical switches are disclosed by E. M. Philipp-Rutz, et al in an article entitled "Electrooptic Bragg diffraction switches in low crosstalk integrated-optics switching matrix" (*Applied Optics*, Vol. 21, No. 12, June 1982, pages 2189-2194).

In comparison with all these optical switches, the switch according to the invention advantageously has a comparatively simple construction with geometrically predetermined radiation paths. It also has low power consumption for shifting the grating sections, low-loss polarization-independent operation, and a high crosstalk attenuation.

Such optical switches can be used to construct arrays of optical switching matrices with a plurality of input and output ports. In such matrices, each input and output port is a first port of an optical switch according to the invention. The number of second ports of each switch corresponds to the number of output or input ports in the matrix. The second ports of every switch are optically connected to a second port of a different switches. This switching matrix enables information, for example modulated light, to be transmitted from any of the input ports to any desired output port, without transmitting information to the other output ports.

Another advantageous embodiment of the invention enables the construction of optical concentrators with a plurality of input ports and a smaller number of output ports. In these concentrators, groups of input ports are the second ports of an optical switch according to the invention. The output port of the concentrator is the first port of an optical switch according to the invention. The output ports, which each from part of an optical switching matrix, are connected to second ports of different optical switches.

Concentrators of this type are used for selectively transmitting light which is received via a plurality of input lines to a specific output line, for example a trunk line. The number of output lines is smaller than the number of input lines. Concentrators further have the advantage that the number of second ports of the optical switches can be comparatively small.

BRIEF DESCRIPTION OF THE DRAWING

FIG. 3b schematically shows the effective phase profile of the compound phase grating shown in FIG. 3a.

DESCRIPTION OF THE PREFERRED EMBODIMENTS

First, it will be illustrated how a compound transmission phase grating comprising two stepped grating sections can be switched to diffract an input beam to one of the three central diffraction orders $-1$, 0 and $+1$. Referring to FIG. 1, the groove profiles of two grating sections $U_1$ and $U_2$ are stepped surface reliefs (also referred to as digital surface structures) which exactly match one another and which are made of the same material. One profile is an exact impression of the other profile (i.e. a negative copy). Such profiles can be formed by locally selective etching processes. Copies of these originals and copies of copies can be manufactured from specific plastics, for example by a photopolymerization process.

The grating sections $U_1$ and $U_2$ each comprise an odd number of steps, for example 5 steps, per grating period $\Delta$. There is one step of double width, which in a symmetrical arrangement may be regarded as the basic step. The step heights from this central basic step toward the end of the grating period $\Delta$ of the grating sections $U_1$ and $U_2$ are determined from the formula $$\text{step height} = 0, d, 3d, 6d, \ldots, 0.5N(N+1)d, \tag{1}$$

where $(2N+1)$ is the number of steps per grating period. The increase of the step height from the center toward the edges is in principle parabolic. In addition to this there is a linear portion as a result of the presence of the double basic step.

Figure 1A:
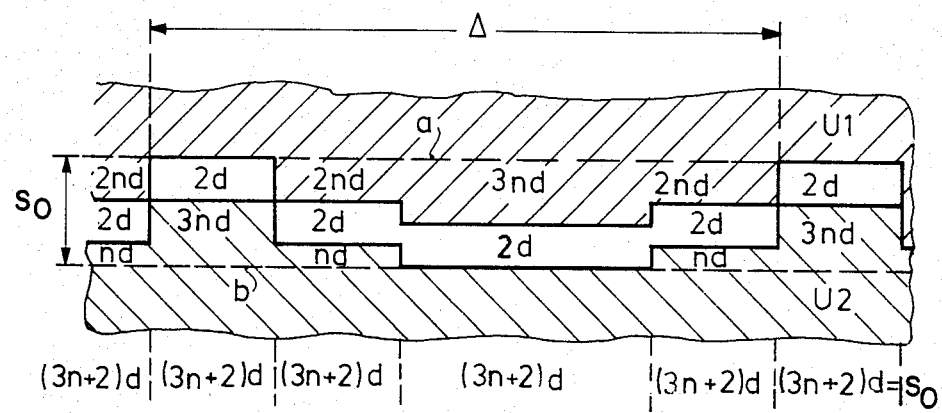
FIG. 1a is a cross-sectional view of a compound phase-grating having two stepped (digital) grating sections in the initial configuration. Each grating section has an odd number of steps per grating period.

Thus, the geometric step height in the grating section $U_1$ in FIG. 1a varies (from left to right for equal step widths in the cross-section of FIG. 1a) from $\ldots$, 2d, 0, 2d, 3d, 3d, 2d, 0, 2d, $\ldots$. The geometric step heights in the grating section $U_2$ are the same: $\ldots$ d, 3d, d, 0, 0, d, 3d, d, $\ldots$.

In order to move the grating sections $U_1$ and $U_2$ relative to each other in a direction perpendicular to the grating grooves, the two grating sections are spaced from each other by a distance 2d.

The optical path length $s_o$ (in the transmission mode) between the two planes a and b, shown in broken lines, in the two grating sections $U_1$ and $U_2$ is uniform in FIG. 1a (i.e. independent of the location), namely $$s_o = (3n + 2)d \tag{2}$$

where n is the refractive index of the dielectric material and d is the unit of geometrical step height.

This means that in the compound grating shown in FIG. 1a there is no effective optical grating structure at all (i.e. the phase grating diffracts incident light into the zeroth order (the normal direction).

Figure 1B:
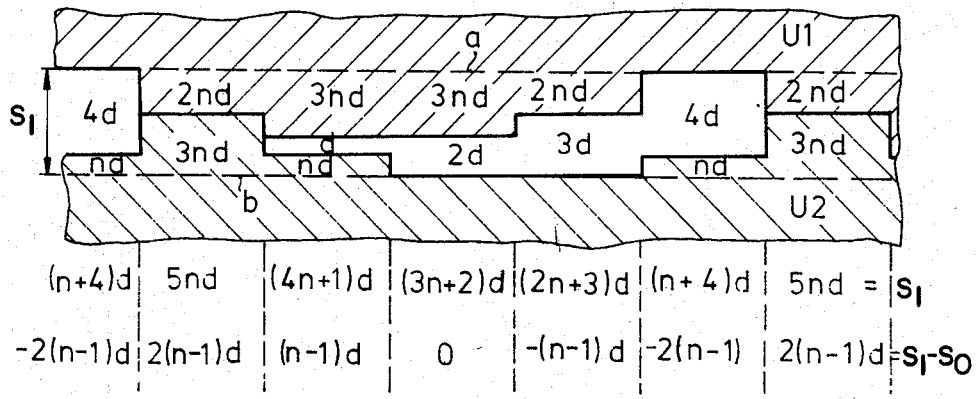
FIG. 1b is a cross-sectional view of the same compound phase grating shown in FIG. 1a, but in a shifted configuration.

If, as is shown in FIG. 1b, for example, the grating section $U_1$ is shifted by one step width (typically approximately 10/$\mu$m) to the left, the optical path lengths $s_1$ between the two planes a and b from left to right are:

$$s_1 = \ldots, (n+4)d, 5nd, (4n+1)d, (3n+2)d, (2n+3)d, (n+4)d, 5nd, (4n+1)d, \ldots \quad (3)$$

The optical path length differences with respect to the path length $s_0 = (3n+2)d$ are $$s_1 - s_0 = \ldots, -2(n-1)d, 2(n-1)d, (n-1)d, 0, -(n-1)d, -2(n-1)d, 2(n-1)d, (n-1)d, \ldots \quad (4)$$

Figure 1C:
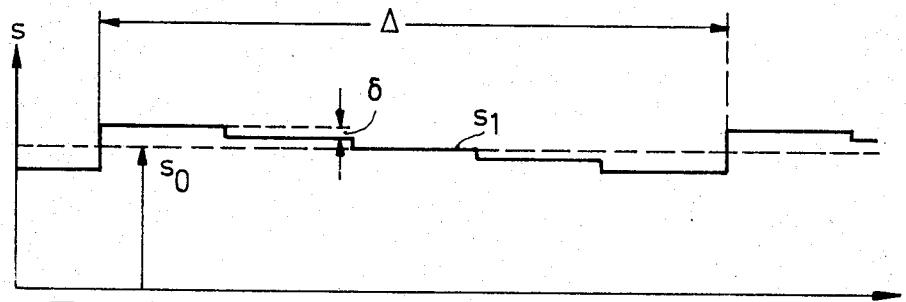
FIG. 1c schematically shows the effective optical grating profile of the compound phase grating shown in FIG. 1b.

The effective optical path length profile of the compound grating is shown in FIG. 1c. It will be seen that $s_1$ (and $s_1 - s_0$) has a regular five-step profile having a "digital" blaze if the optical step height (difference between the phase delays of two adjacent steps) is $\lambda/5$ ($\lambda$=wavelength of the incident light). In FIG. 1b, this optical step height is $(n-1)d$, so that $(n-1)d = \lambda/5$.

Phase gratings with such profiles are known and have already been investigated extensively, as described by H. Dammann in articles entitled "Spectral characteristic of stepped-phase gratings" (*Optik*, Vol. 53, No. 5, 1979, pages 409-417) and "Blazed Synthetic Phase-Only Halograms" (*Optik*, Vol. 31, No. 1, 1970, pages 95-104). With such a five-step phase profile, a blaze efficiency of (theoretically) 87.4% can be achieved for the first diffraction order. No light is diffracted into the adjacent diffraction orders. The general requirement for this is $$\phi(\lambda) - 2\pi\theta/p = 2\pi K \quad (5)$$

where $\lambda$=wavelength of the light, q=number of the diffraction order (in the present case q=+1), P=number of steps per grating period $\Delta$ (in the present case P=5), k=an integer, and $\phi(\lambda)$ is the phase delay produced in a basic step of the profile. In accordance with FIG. 1c, the corresponding path length difference $\delta = (n-1)d$, so that it follows from $$\phi(\lambda) = 2\pi(\delta/\lambda) \quad (6)$$

that $$(n-1)d = (k + (\theta/p))\lambda \quad (7)$$

For a simple practical example (k=0, q=1, P=5, n-1=0.5, $\lambda$=1 /$\mu$m) this yields d=0.4/$\mu$m. Grating sections with the required maximum etching depth of approximately 1 $\mu$m can be manufactured without any problems.

The grating sections $U_1$ and $U_2$ used in FIG. 1 have symmetrical profiles. Therefore, it will be evident that a corresponding shift of the grating section $U_1$ to the right (instead of to the left as shown in FIG. 1b) will yield an effective grating profile for diffracting incident light into the other first diffraction order (diffraction order = −1). Thus, by mechanically shifting the grating sections relative to each other, the incident beam can be switched between the three central diffraction orders +1, 0, −1.

The magnitude of the shift, which corresponds to one step width, is typically in the range of approximately 10 $\mu$m. The grating structure itself imposes a lower limit of approximately 1 /$\mu$m for physical/optical and technological reasons. An upper limit is imposed by the need for a switch which is compact, simple, fast, and cheap, and which has low power comsumption. FIGS. 1a and 1b show an example of a suitable stepped ("digital") grating structure for the transmission of light. However, there are other suitable digital structures as well as suitable continuous ("analog") grating structures, and it is alternatively possible to use reflection gratings. In many cases, more than the three central diffraction orders −1, 0, +1 ( for example also the ±2nd diffraction orders) can be obtained by further shifting the grating sections relative to each other. However, the technological complexity of such gratings then increases because a larger number of steps is then required.

Figure 2A:
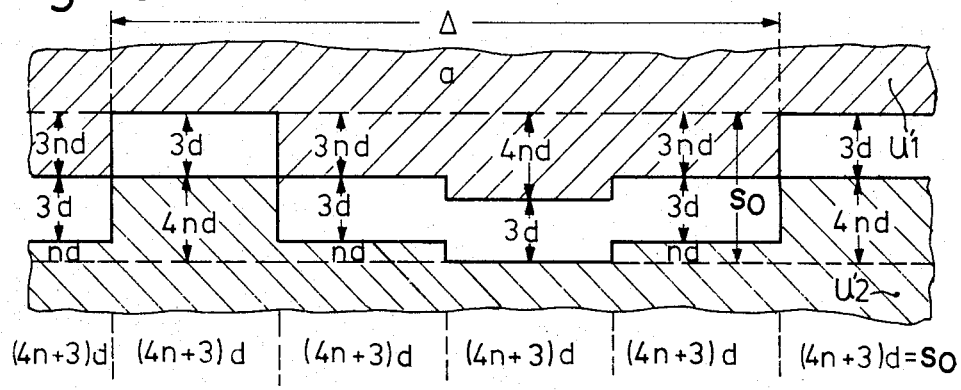
FIG. 2a is a cross-sectional view of a compound phase grating having two stepped (digital) grating sections in the initial configuration. Each grating section has an even number of steps per grating period.
Figure 2B:
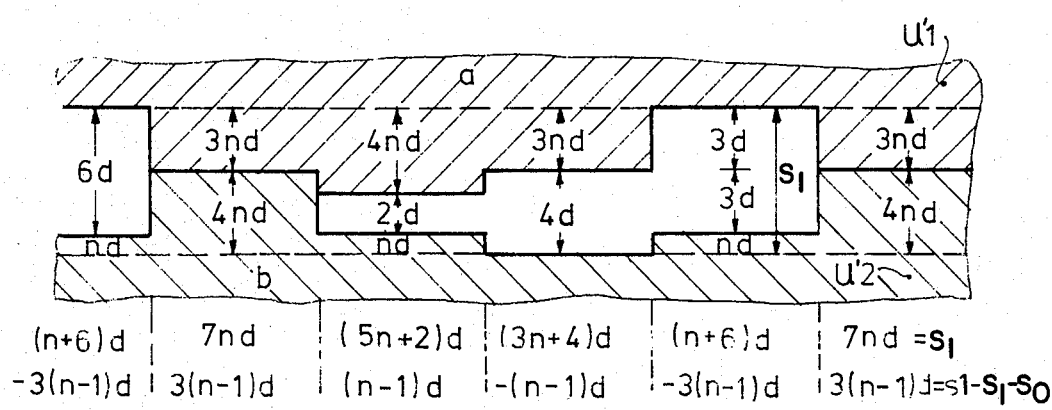
FIG. 2b is a cross-sectional view of the compound phase grating of FIG. 2a, but in a shifted configuration.
Figure 3A:
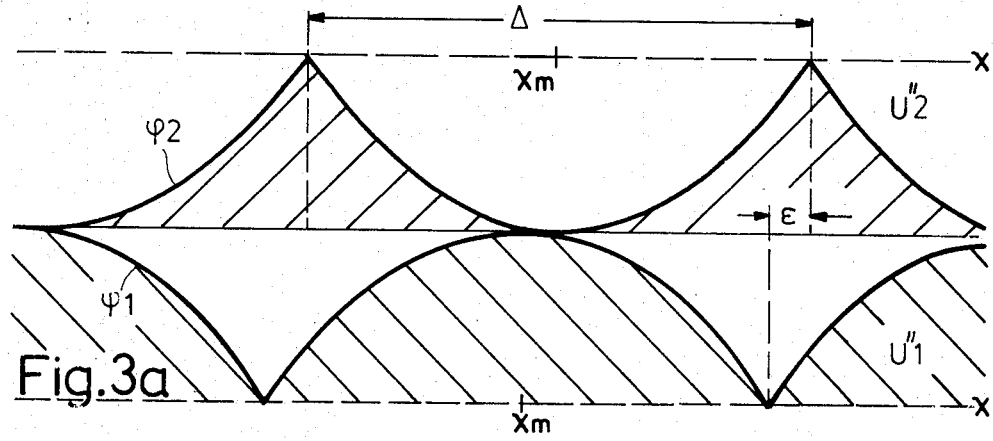
FIG. 3a schematically shows the phase profiles of two analog phase gratings which are shifted relative to each other by a distance $\epsilon$.
Figure 3B:
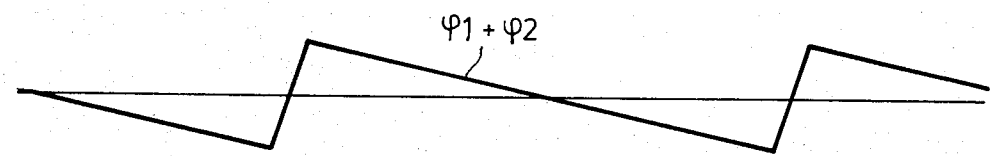
Figure 4:
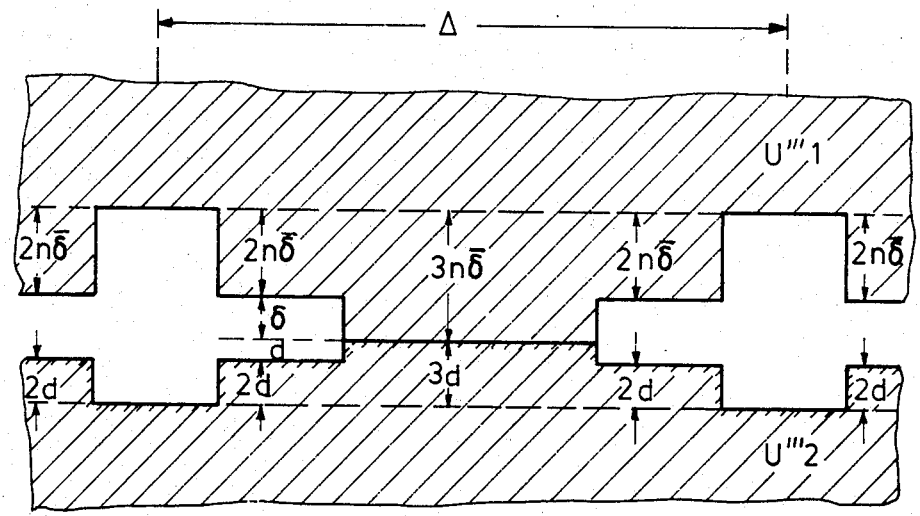
FIG. 4 is a cross-sectional vie of a compound phase grating comprising two digital grating sections. The upper surface of one grating section is provided with a reflective layer.

FIGS. 2 to 4 show further examples of compound phase gratings with suitable grating structures.

Figure 2C:
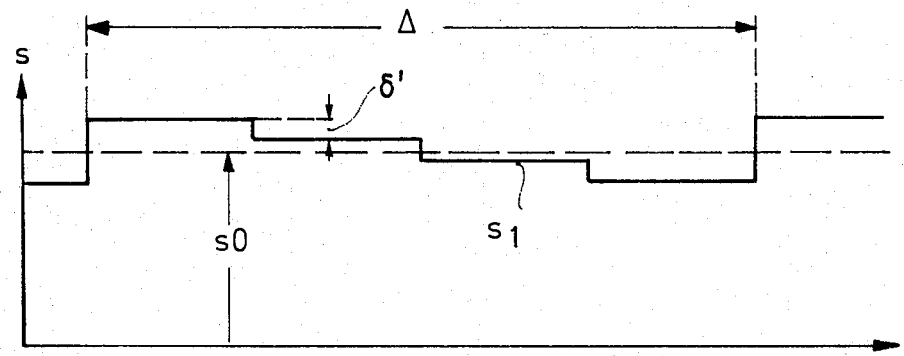
FIG. 2c schematically shows the effective optical grating profile of the compound phase grating shown in FIG. 2b.

FIG. 2 shows a transmission compound phase grating. The grating has digital grating sections $U'1$ and $U'2$, each with a four-step blaze profile (compare FIG. 2c). The grating sections $U'1$ and $U'2$ have even numbers of steps per grating period $\Delta$.

Viewed from the center toward the ends of the grating period $\Delta$, the steps in the grating section $U'2$ have the following heights: 0, d, 4d, 9d, ..., $N^2d$, where 2N is the number of step widths per grating period $\Delta$. The step heights within the grating period $\Delta$ are thus parabolic, as are the optical path lengths. Similarly, the steps and the optical path lengths in the grating section $U'1$ are parabolic, because in the same way as shown in FIG. 1, grating $U'1$ is an impression of the grating section $U'2$ (a negative copy).

FIG. 2b shows the two grating sections $U'1$ and $U'2$ in a configuration in which they are shifted by one step width, so that the four-step optical path length profile $s_1 - s_0$ shown in FIG. 2c is obtained. Equations 5 to 7 can then be used for calculating the step heights. However, now P (the number of steps per grating period $\Delta$) equals 4. In this case $\delta$ is $2(n-1)d$, as follows from FIG. 2b.

FIGS. 3a and 3b show an example of a compound phase grating comprising analog grating sections $U''1$ and $U''2$. In each grating section, the optical path length varies continuously and parabolically within the grating period $\Delta$. The surface profile of the grating section has a corresponding undulating shape.

FIG. 3a shows the corresponding curves of the phase delays $\phi_1$ and $\phi_2$ for the two grating sections $U''1$ and $U''2$. The phase delays also vary parabolically. The following equation is then valid $$\phi = \phi_0 \left( \frac{x - x_m}{\Delta/2} \right)^2, \quad (8)$$

where x is the positon coordinate in a direction perpendicular to the grating grooves, $x_m$ is the coordinate in the center of each groove, $\Delta$ is the grating period and $\pm\phi_0$ the maximum or minimum phase.

The grating section $U''2$, for example, has a phase delay $\phi_2 = \phi$ (in the unshifted position), so that the grating section $U''1$ must have a phase delay $\phi_1 = -\phi$.

In FIG. 3a these two profiles are shown superimposed and shifted by a distance relative to each other. FIG. 3b shows the resulting phase profile $\phi_1 + \phi_2$. This phase profile $\phi_1 + \phi_2$ has the well-known sawtooth-shaped blaze profile. The "diffraction" angle of this profile can be adjusted by a suitable choice of the shift $\epsilon$.

Thus, it is possible by selecting $\epsilon$ to select which central diffraction order the incident beam will be diffracted into. For a specific diffraction order the necessary shift $\epsilon$ depends on the maximum phase shift $\phi_0$. The necessary shift $\epsilon$ decreases as this phase $\phi_0$ increases. $\epsilon$ must be small in comparison with $\Delta$, because an excessive slope of the edges of the sawtooth profile must be avoided. For example, for $\phi_0=2$ a shift $\epsilon$ of approximately $\frac{1}{8}\Delta$ is required inorder to obtain the blaze for the first order.

Analog phase gratings with parabolic phase profiles, can be constructed as relief gratings or refractive-index gratings. In any case, the optical path length difference between the center and the ends of a grating period must be greater than the wavelength $\lambda$ of the incident light wave if optical switching is to be obtained for a shift of $\frac{1}{8}$ of the grating period.

In the case of relief gratings, the surface is modulated to such an extent that the periodic phase shift of the incident light wave is obtained by a variation in the thickness of the layer of a material with a homogeneous refractive index n. Relief gratings can be manufactured cheaply by embossing plastic plates. The die is made of a hard metal by reactive sputter etching. The shape of the die is controlled by a suitable setting of the pressure of the reactive gas, the energy and the angle of incidence of the sputter ions (Ar+), and the mask.

A switch which is resistant to faults has piezoelectric shifting of plane-parallel plates having an analog refractive-index grating structure. The maximum index step within a grating period must be greater than the quotient of the plate thickness d and the wavelength (approximately 1.5 $\lambda$/d). For a plate thickness of d=1 mm the index step must be at least $1.5 \cdot 10^{-3}$.

It is known that when manufacturing synthetic crystals according to the Czochralski-method, the refractive index can be influenced by external electric fields. By electron transport processes, an index grating with a controllable refractive index profile is formed in the crystal by periodically varying the electric current during the crystal growth. From this, crystal plates with a suitable geometry and a substantially congruent grating structure can be cut.

A similar method is the doping of materials with impurities either by ion bombardment, which is modulated periodically by suitable masks, or by thermal diffusion of impurities which are deposited on the surface of the transparent electrooptical crystals in suitable concentrations. Again the parabolic refractive index profile can be formed in a controlled manner by a suitable mask and through the diffusion depths of the impurities (which depend on the square of the diffusion time).

FIG. 4 shows an example of a compound phase grating with an adjustable blaze. This grating operates in the reflection mode, and its grating sections U'''1 and U'''2 are digital stepped gratings. The gratings section U'''1 is a transmission phase grating comprising five steps per grating period $\Delta$. The grating section U'''2 is a five-step digital grating, whose surface is provided with a light-reflecting layer. The structures of these grating sections correspond to the structures of the phase gratings described with reference to FIG. 1. However, as a result of the reflection from the grating section U'''2 and the consequent repeated passage of the light through the grating section U'''1, different step heights are obtained. In general, $$(n-1)\bar{\delta}=\lambda/10=d \qquad (9)$$

where $\lambda$ is the wavelength of the light, n is the refractive index, and $\bar{\delta}$ the step height of the grating section of U'''1, and d the step height of the grating section U'''2.

For shifting the grating sections shown in the Figures, piezoelectric actuators are particularly suitable. These actuators have extremely low switching powers ($4 \cdot 10^{-5}$ J per shift) and high switching frequencies ($\gtrsim 1$ kHz).

Figure 5:
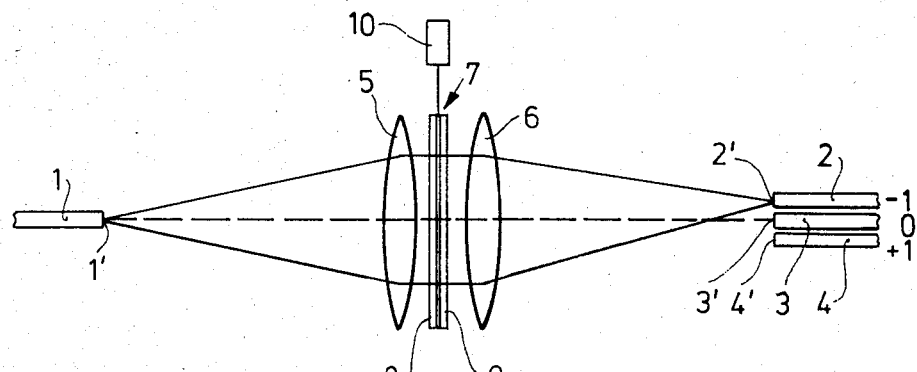
FIG. 5 schematically shows an optical switch having a compound phase grating according to the invention.

By means of compound phase gratings with mechanically adjustable blaze, it is possible to construct optical switches. FIG. 5 illustrates an example of the principle of such an optical switch. Using such a switch, a glass fiber 1 can be optically connected to one of three other glass fibers 2, 3 or 4. "Optically connected" means that a path is provided for the optical signals which propagate in the glass fibers.

In the switch shown in FIG. 5, the end face 1' of the glass fiber 1 (first optical port) is imaged on the end face 2' (second optical port) of a second glass fiber 2 by an imaging system. The imaging system comprises two convex lenses 5 and 6. An optical connection (an optical path) is established between the two fibers 1 and 2.

A transmission phase grating 7, comprising two grating sections 8 and 9 which are movable relative to each other, is arranged between the two lenses 5 and 6. Three glass fibers 2, 3 and 4 are arranged at the locations of the three central diffraction orders +1, 0, −1 of grating 7. As explained above, the blaze of the grating can be switched mechanically to diffract light from fiber 1 to one of the three central diffraction orders, for example by means of a piezoelectric actuator 10. In FIG. 5, it is assumed that this blaze has been set to the −1st diffraction order.

The optical signals in the glass fibers (FIG. 5) can travel from the left to the right or from the right to the left. In the first case the optical switch connects an optical input channel to any one of three output channels. In the latter case, one of three input channels is connected to an output channel.

When a reflection grating (for example as shown in FIG. 4) is used, the second lens in the arrangement shown in FIG. 5 may be dispensed with. All the glass fibers are then disposed on one side, and the grating is slightly inclined.

Figure 6:
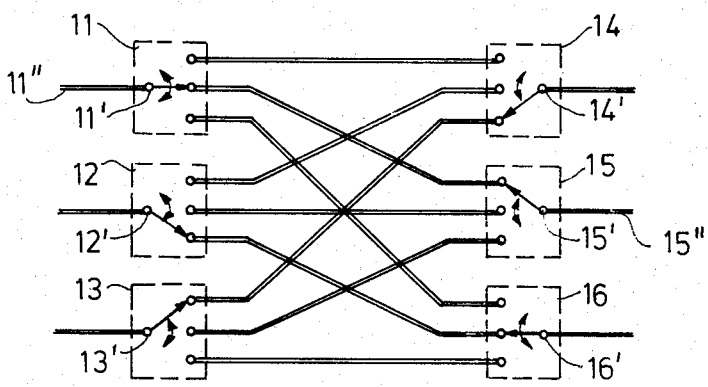
FIG. 6 schematically shows an optical switching matrix comprising a plurality of optical switches.

FIG. 6 schematically shows an optical switching matrix between three input and three output ports. The input ports are glass fiber end faces 11', 12' and 13', and the output ports are end faces 14', 15' and 16'. The switching matrix includes 6 optical switches 11–16 each having three switching positions −1, 0, +1. Each of the input and output ports 11'–16' corresponds to the first optical port 1' of the optical switch shown in FIG. 4.

It can be seen that for establishing a connection, for example between the fibers 11'' and 15'', the grating switches 11 and 15 must be set to the correct positions. Since each connection is made by two switches in series, the crosstalk in a single switch may be comparatively high. For example, if in a switch 2% of the light energy is deflected to the "wrong" fiber, the crosstalk of the switching matrix remains $<10^{-3}$ or $>30$ dB.

Figure 7:
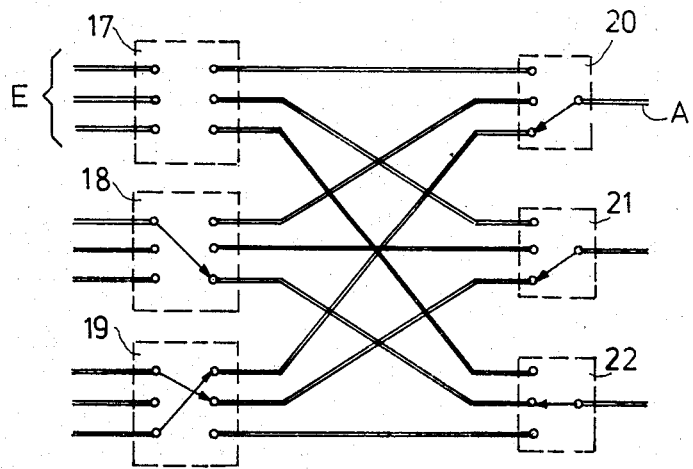
FIG. 7 schematically shows an optical concentrator having nine inputs and three outputs.

FIG. 7 shows how an optical concentrator comprising nine inputs and three outputs can be formed by, for example, three optical switching matrixes 17, 18, and 19 as shown in FIG. 6 and three separate optical switches 20, 21 and 22, corresponding to the switches 14, 15, and 16 as shown in FIG. 6. A group of three inputs is connected to an optical switching matrix as shown in FIG. 6. Each input line E can be connected to any output line A.

This concentrator can be called a concentrator in the full beam. In a similar manner, concentrators comprising more than nine inputs or more than three outputs can be constructed. A suitable arrangement also permits incomplete beams to be formed, in which case an input cannot be switched to every output.

What is claimed is:

1. A compound optical phase grating comprising:
   a substantially planar first grating section having parallel grooves, having a grating period, and having a grating profile which is repeated once each grating period; and
   a substantially planar second grating section having parallel grooves, having a grating period equal to the grating period of the first grating section, and having a grating profile which is repeated once each grating period, said second grating section being arranged opposite and parallel to the first grating section with the grooves in the first grating section parallel to the grooves in the second grating section, the first and second grating sections being movable relative to each other in their planes in a direction perpendicular to the grooves;
   characterized in that:
   each grating profile is at least substantially parabolic;
   each grating profile is symmetrical about the center of each grating period; and
   when the first and second grating sections are both arranged symmetrically about a common line perpendicular to the grating, the compound grating has an optical path length therethrough which is uniform across the grating.

2. A compound optical phase grating as claimed in claim 1, characterized in that each grating section is a digital phase grating such that the grooves are steps.

3. A compound optical phase grating as claimed in claim 2, characterized in that each grating section is a refractive-index grating.

4. A compound optical phase grating as claimed in claim 2, characterized in that each grating section is a relief grating.

5. A compound optical phase grating as claimed in claim 4, characterized in that one grating section is provided with a reflective layer on a surface of the grating section.

6. A compound optical phase grating as claimed in claim 5, characterized in that:
   each grating section has an odd number of grating steps in each grating period; and
   the optical path length through the grating steps varies as a function of position over the grating period, the function being parabolic with a superimposed linear portion.

7. A compound optical phase grating as claimed in claim 5, characterized in that:
   each grating section has an even number of grating steps in each grating period; and
   the optical path length through the grating steps varies as a parabolic function of position over the grating period.

8. A compound optical phase grating as claimed in claim 5, further comprising a piezoelectric actuator for moving the first and second grating sections relative to each other.

9. A compound optical phase grating as claimed in claim 1, characterized in that each grating section is an anlaog phase grating.

10. A compound optical phase grating comprising:
    a substantially planar first grating section having parallel grooves, having a grating period, and having a grating profile which is repeated once each grating period; and
    a substantially planar second grating section having parallel grooves, having a grating period equal to the grating period of the first grating section, and having a grating profile which is repeated once each grating period, said second grating section being arranged opposite and parallel to the first grating section with the grooves in the first grating section parallel to the grooves in the second grating section, the first and second grating sections being movable relative to each other in their planes in a direction perpendicular to the grooves;
    characterized in that:
    each grating profile is at least substantially parabolic;
    each grating profile is symmetrical about the center of each grating period;
    the profile of the first grating section is a negative copy of the profile of the second grating section;
    when the first and second grating sections are both arranged symmetrically about a common line perpendicular to the grating, the compound grating has an optical path length therethrough which is uniform across the grating; and
    when the grating sections are moved relative to one another, the grating has an effective blaze which is changed to diffract incident light into a different diffraction order.

11. A compound optical phase grating as claimed in claim 10, characterized in that each grating section is an analog phase grating.

12. A compound optical phase grating as claimed in claim 10, characterized in that each grating section is a digital phase grating such that the grooves are steps.

13. A compound optical phase grating as claimed in claim 12, characterized in that:
    each grating section has an odd number of grating steps in each grating period; and
    the optical path length through the grating steps varies as a function of position over the grating period, the function being parabolic with a superimposed linear portion.

14. A compound optical phase grating as claimed in claim 12, characterized in that:
    each grating section has an even number of grating steps in each grating period; and
    the optical path length through the grating steps varies as a parabolic function of position over the grating period.

15. A compound optical phase grating comprising:
    a substantially planar first grating section having parallel grooves, having a grating period, and having a grating profile which is repeated once each grating period; and
    a substantially planar second grating section having parallel grooves, having a grating period equal to the grating period of the first grating section, and having a grating profile which is repeated once each grating period, said second grating section being arranged opposite and parallel to the first grating section with the grooves in the first grating section parallel to the grooves in the second grating section, the first and second grating sections being movable relative to each other in their planes in a direction perpendicular to the grooves;

characterized in that:

each grating profile is at least substantially parabolic;

each grating profile is symmetrical about the center of each grating period;

when the first and second grating sections are both arranged symmetrically about a common line perpendicular to the grating, the compound grating has an optical path length therethrough which is uniform across the grating; and the first and second grating sections are moveable relative to one another over a distance not greater than the grating period.

* * * * *